(12) United States Patent
Dietrich

(10) Patent No.: US 8,877,347 B2
(45) Date of Patent: Nov. 4, 2014

(54) WEAR ELEMENT, AND COMPONENT PROVIDED THEREWITH

(75) Inventor: Michael Dietrich, Dortmund (DE)

(73) Assignee: Caterpillar Global Mining HMS GmbH, Dortmund (DE)

( * ) Notice: Subject to any disclaimer, the term of this patent is extended or adjusted under 35 U.S.C. 154(b) by 1121 days.

(21) Appl. No.: 12/520,319

(22) PCT Filed: Nov. 28, 2007

(86) PCT No.: PCT/EP2007/010308
§ 371 (c)(1),
(2), (4) Date: Jun. 19, 2009

(87) PCT Pub. No.: WO2008/074387
PCT Pub. Date: Jun. 26, 2008

(65) Prior Publication Data
US 2009/0311550 A1  Dec. 17, 2009

(30) Foreign Application Priority Data
Dec. 19, 2006  (DE) .......................... 10 2006 059 894

(51) Int. Cl.
| B32B 15/01 | (2006.01) |
| E02F 9/00 | (2006.01) |
| B23K 5/00 | (2006.01) |
| E02F 9/28 | (2006.01) |
| E02F 3/815 | (2006.01) |

(52) U.S. Cl.
CPC .................. *E02F 9/28* (2013.01); *E02F 9/2883* (2013.01); *E02F 9/285* (2013.01); *B32B 15/01* (2013.01); *E02F 3/8152* (2013.01); *B23K 5/00* (2013.01)

USPC ............ 428/668; 428/614; 428/615; 37/444; 37/451; 37/453; 172/772

(58) Field of Classification Search
USPC .............................. 37/444, 451, 453; 172/772
See application file for complete search history.

(56) References Cited

U.S. PATENT DOCUMENTS 2,210,357 A     8/1940  Geoffrey
3,744,239 A  *  7/1973  I'Anson ............................ 59/84

(Continued)

FOREIGN PATENT DOCUMENTS

| DE | 201 05 994 U1 | 8/2001 |
| DE | 20 2004 003910 | 7/2005 |
| FR | 2 304 021 A | 10/1976 |
| JP | 11 090251 A | 4/1999 |

OTHER PUBLICATIONS

International Search Report of PCT/EP2007/010308 mailed May 2, 2008 w/ English translation.

(Continued)

*Primary Examiner* — Gwendolyn Blackwell
*Assistant Examiner* — Lucas Wang
(74) *Attorney, Agent, or Firm* — Foley & Lardner LLP

(57) ABSTRACT

A wear element for component subject to abrasive influences, for example in a region of a receiving element for bulk material, includes an element formed by a one-piece, approximately plate-shape molded body made of a wear resistant alloy. The molded body is configured not to be planar in any plane. The molded body has an approximately rectangular cross-section and includes longitudinal sides and lateral sides that are rounded sections flowing into each other.

16 Claims, 2 Drawing Sheets

(56) References Cited

U.S. PATENT DOCUMENTS

| | | | |
|---|---|---|---|
| 4,187,626 A * | 2/1980 | Greer et al. | 37/453 |
| 4,396,234 A | 8/1983 | Garrett | |
| 4,886,218 A | 12/1989 | Bradley | |
| 5,063,695 A * | 11/1991 | Briscoe et al. | 37/451 |
| 5,328,776 A * | 7/1994 | Garber et al. | 428/614 |
| 5,564,508 A | 10/1996 | Renski | |
| 6,041,529 A * | 3/2000 | Ruvang | 37/446 |
| 7,178,274 B2 * | 2/2007 | Emrich | 37/453 |
| 2005/0200146 A1* | 9/2005 | Mieger et al. | 294/106 |
| 2006/0177689 A1* | 8/2006 | Muir et al. | 428/684 |
| 2006/0269766 A1* | 11/2006 | Swank et al. | 428/469 |
| 2006/0283056 A1* | 12/2006 | Risch et al. | 37/466 |
| 2007/0084094 A1* | 4/2007 | Bentley | 37/452 |
| 2007/0148487 A1* | 6/2007 | Kramer | 428/544 |
| 2008/0093912 A1* | 4/2008 | Willoughby | 299/107 |

OTHER PUBLICATIONS

Written Office Action of PCT/EP2007/010308 w/ English translation.
International Preliminary Examination Report of PCT/EP2007/010308 dated Jan. 27, 2009 w/ English translation.

* cited by examiner

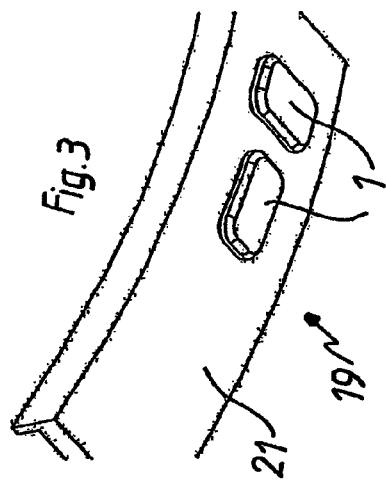
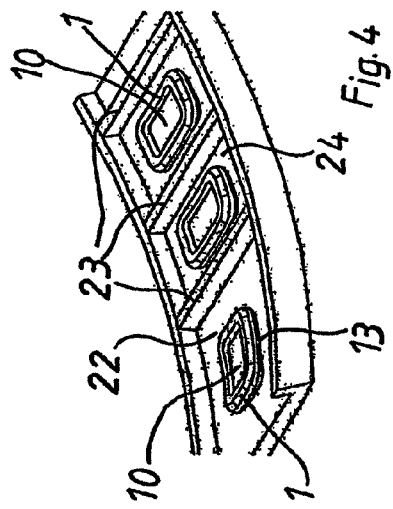
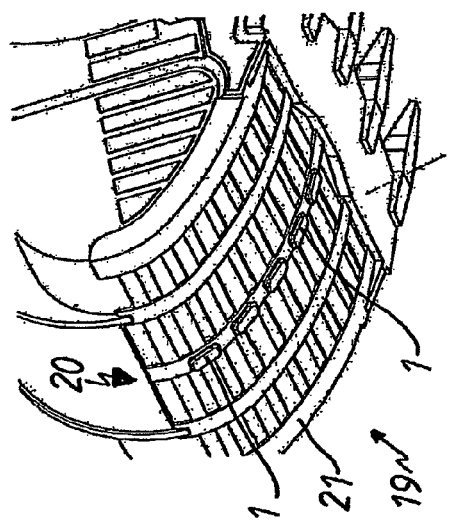

WEAR ELEMENT, AND COMPONENT PROVIDED THEREWITH

BACKGROUND

The invention relates to a wear element for components subject to abrasive influences for use in an area of a receiving element for bulk material, the wear element comprising: a one-piece molded body comprising a wear-resistant alloy, wherein the molded body has no planar surface.

Generally known are wear elements consisting of a basic body (weldable base material) with a hard wear layer welded onto it. Components of this type have the disadvantage of having a soldering joint between the basic body and the wear layer. Pulse-type stresses during the operational state can be absorbed only with limitation, thereby resulting in a limited service life for the receiving element for bulk material, which is provided with the wear element. When using such wear elements in the area of radii, only extremely small units can be welded on, which increases the time expenditure and is also tied to increased costs.

German patent document DE 201 05 994 U1 discloses an armor-plating for a surface subject to wear, consisting of a structured surface with thereon embodied pockets for accommodating the material acting upon the armor-plating, so as to form an autogenous wear protection. The armor-plating in this case consists at least in some sections of a connected and essentially homogeneous body, with respect to its mechanical load characteristics, and therein formed pockets that are open toward the outside. Concrete areas of use are defined as excavator buckets, mining equipment and roller presses. Correspondingly shaped hard inserts are fitted into the different pockets, which can optionally be embodied differently, wherein the basic body is connected through welding with the respective component. Components of this type are expensive to produce and accordingly are tied to high costs. With respect to the outer geometry, it is difficult to provide these components in the area of radii.

German patent document DE 20 2004 003 910 U1 discloses a gripping tool, preferably a multiple-bowl gripper comprising at least one gripper bowl with at least one prong. At least one wear element is arranged on the at least one gripper bowl, such that the main area of wear is covered by the at least one wear element. The wear elements are embodied as circular segments and enclose the rounded areas of the gripper bowl, which are subject to the wear.

French patent document FR 2 304 021 discloses a wear element, which can be fitted onto components subject to wear and located on a construction machine. The wear element is embodied in the manner of a shield, consisting of high-strength steel and can be connected at least around its circumference to the respective surface. The shield surface is provided with a convexity, such that the circumference of the shield is embodied cone-shaped or polygonal.

U.S. Pat. No. 5,564,508 describes a replaceable wear element, which can be positioned in the edge regions of an excavator bucket. By using defined locking elements, the respective wear element is positioned in the respective area of use, such that it can be replaced following the wear with a different type of wear element.

SUMMARY

It is an object of the present invention to provide a wear element for components subject to abrasive influence, which can be produced easier and cheaper as compared to the wear elements according to prior art and can additionally be attached at optional locations on the component to be protected. It is an additional object to propose a component provided with the wear element, for which the service life can be increased as a result of using the wear element.

The above and other objects are solved in accordance with the invention wherein there is provided a wear element for components subject to abrasive influence and used in particular as a receiving element for bulk material, which is embodied as a one-piece molded body of a wear-resistant alloy, wherein the molded body is not configured planar in any plane, characterized in that the molded body is embodied approximately plate-shaped and has an approximately rectangular cross section, wherein the longitudinal sides as well as the lateral sides are formed by round sections that flow into each other.

According to a further aspect of the invention there is provided a component subject to abrasive influence, in particular a receiving element for bulk material, which is provided with a wear element that is arranged at defined inside or outside surfaces on a receiving element on an excavator, in particular a large excavator.

In contrast to the prior art, a one-piece molded body is thus proposed, which can be used universally. The approximately plate-shaped molded body is provided in all planes with rounded surface areas and is provided according to another inventive idea with prepared welding seams for covered HV seams.

As a result of its geometric design, the molded body can be used in any orientation (lengthwise, crosswise, and diagonal) on the bucket inside as well as on the bucket outside.

The material used for the molded body advantageously is an alloy, for which the essential elements are iron, chromium, silicon, molybdenum and vanadium.

As a result of the plate thickness and the extremely stable welding connection, only a few of the molded bodies are sufficient to protect a receiving element embodied as a bucket, thus saving production costs as well as weight. The wear element can be used to retrofit receiving elements such as buckets, scoops or the like for bulk material. One preferred use is for the receiving element of an excavator, in particular a large excavator used for mining operations.

When producing this molded body in two to three different sizes, all known receiving elements for bulk material can be armor-plated cost-effectively and easily, wherein the service life of the respective receiving element is increased as compared to the presently used armor-plating.

BRIEF DESCRIPTION OF THE DRAWINGS

The subject matter of the invention is shown with the aid of an exemplary embodiment in the drawing and is described as follows, showing in:

FIG. 2 An indicated bucket-type receiving element together with the wear elements, which can be used for a hydraulic excavator;

FIG. 3 A detail showing the underside of the bucket according to FIG. 2;

FIG. 4 A detail showing the inside of the bucket according to FIG. 2.

DETAILED DESCRIPTION

Figure 1:
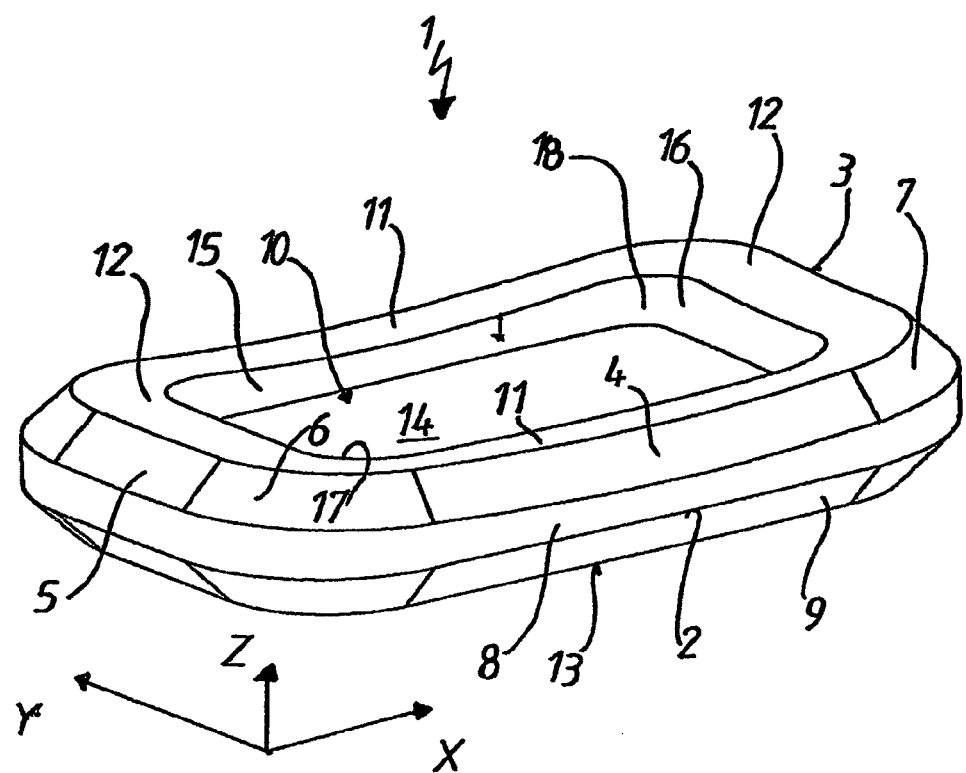
FIG. 1 A basic diagram of a wear element according to the invention in a three-dimensional view.

FIG. 1 illustrates a wear element 1 according to the invention, which consists of a one-piece, approximately rectangular molded body of a wear-resistant alloy, wherein the wear element 1 is not embodied planar in any plane (X, Y, and Z). The longitudinal sides 2 as well as the lateral sides 3 of the wear element 1 are provided with rounded sections 4, 5 that flow into equally rounded corner areas 6, 7, such that the sections 4, 5, 6, 7 merge into each other. In the same way, the regions 4, 8, 9, which are arranged above each other as seen in Z direction, are also embodied rounded and flow into each. A recess 10 is inserted in the region of one of the front faces, so that rounded edge regions 11, 12 are formed around the circumference. The edge regions 11, 12 are embodied such that an inward bulging (concave) edge regions 11, 12 is created. The opposite-arranged front face 13 (not visible herein) is embodied bulging toward the outside, meaning it is convex. The degree of bulging in each case is specified by one skilled in the art in dependence on the concrete area of use. Additional rounded wall sections 15, 16 extend from the edge region 11, 12 toward the bottom 14 of the recess 10, wherein these wall sections are operatively connected through the corner regions 17, 18 that are also rounded. In the region of the bottom 14, symbols (e.g. company logo, component designation or the like) can be incorporated, if applicable, during the molding process.

FIG. 2 only indicates a receiving element 19 for bulk material, which in this case is the loading shovel of a hydraulic excavator that is not shown in further detail herein. Several of the wear elements 1 shown in FIG. 1 are welded on at defined locations 20. FIG. 2 shows the outward bulging, meaning convex, outer region 21 of the receiving element 19. The wear elements 1 are connected through welding with the inward bulging front face, formed by the edge regions 11, 12 (FIG. 1), to the region 21 and thus protect the regions 21 of the receiving element 19 that is subject to abrasive influence from the bulk material it accommodates.

FIG. 3 shows a detail of the lower region 21 to be protected on the receiving element 19 according to FIG. 2. Visible are the wear elements 1, which can be welded on in any optional orientation (lengthwise, laterally) in the region 21 of the receiving element 19.

FIG. 4 shows the positioning of the wear elements 1 on the inside region 22 of the receiving element 19. Shown is a honeycomb-type armor-plating 23, wherein the wear elements 1 are provided in the individual compartments of the honeycomb-type armor-plating 23. For this representation, the wear elements 1 are welded on with the outward bulging, meaning the convex, front face 13 in the region of the respective honeycomb bottom 24, wherein the respective recesses 10 (FIG. 1) point in upward direction.

The invention claimed is:

1. A shovel with a wear element subject to abrasive influence from bulk material, the wear element comprising:
 a one-piece molded body comprising a wear-resistant alloy, wherein the molded body includes only non-planar surfaces, is approximately plate-shaped, has an approximately rectangular cross section, and includes longitudinal sides and lateral sides comprising sections having rounded surfaces that flow into each other;
 wherein the molded body comprises a first front face disposed opposite a second front face, the first front face having a concave shape that corresponds to a convex outer region of the shovel and is attachable to the convex outer region of the shovel, the second front face having a convex shape that corresponds to a concave inner region of the shovel and is attachable to the concave inner region of the shovel.

2. The shovel according to claim 1, wherein the molded body, as seen over its height, includes rounded regions that flow into each other.

3. The shovel according to claim 2, wherein the first front face comprises a recess.

4. The shovel according to claim 3, wherein the molded body has edge regions that delimit the recess and which are at least in part concave.

5. The shovel according to claim 4, wherein the second front face is positioned opposite the edge regions, respectively, and the second front face includes additional edge regions that are at least in part convex.

6. The shovel according to claim 5, further including predetermined symbols inserted during a molding process in an area of at least one of the front faces or the recess.

7. The shovel according to claim 1, wherein the molded body comprises an alloy including iron, chromium, silicon, molybdenum and vanadium.

8. The shovel according to claim 1, wherein the molded body comprises tempered steel that can be welded.

9. The shovel according to claim 8, wherein the molded body has an outer contour with a region including prepared areas for welding seams.

10. The shovel according to claim 1, wherein the-concave front face has concave edge regions that are welded to the convex outer region of the shovel.

11. The shovel according to claim 1, wherein the convex front face has convex edge regions that are welded to the concave inner region of the shovel.

12. A method of retrofitting a shovel, the method comprising:
 providing a plurality of wear elements having a one-piece molded body comprising a wear-resistant alloy and includes only non-planar surfaces, is approximately plate-shaped, has an approximately rectangular cross section, and includes longitudinal sides and lateral sides comprising sections having rounded surfaces that flow into each other, and with a first front face disposed opposite a second front face, the first front face having a concave shape that corresponds to a convex outer region of the shovel, the second front face having a convex shape that corresponds to a concave inner region of the shovel; and
 installing at least one of the wear elements with the concave front face attached to the convex outer region of the shovel.

13. The method of claim 12, further comprising the step of installing at least one of the wear elements with the convex front face attached to the concave inner region of the shovel.

14. The method of claim 13, wherein the steps of installing further comprise the step of welding the wear elements to the shovel.

15. A shovel having improved resistance to abrasive influence from bulk material, comprising:
 a bucket including a convex outer region and a concave inner region;
 a plurality of wear elements comprising a one-piece molded body formed from a wear-resistant alloy, wherein the molded body includes only non-planar surfaces, is approximately plate-shaped, has an approximately rectangular cross section, and includes longitudinal sides and lateral sides comprising sections having rounded surfaces that flow into each other;
 wherein the molded body comprises a first front face disposed opposite a second front face, the first front face having a concave shape that corresponds to the convex outer region of the bucket and the second front face having a convex shape that corresponds to the concave inner region of the bucket; and wherein at least one wear element is attached to the bucket with its concave front face disposed on the convex outer region.

16. The shovel of claim 15, wherein at least one wear element is attached to the bucket with its convex front face disposed on the concave inner region.

* * * * *